(12) United States Patent
Chung

(10) Patent No.: US 6,384,775 B1
(45) Date of Patent: May 7, 2002

(54) METHOD OF IMPROVING THE RECEIVING PERFORMANCE FOR NETWORK-AIDED GPS RECEIVER

(75) Inventor: Do-Hyoung Chung, Suwon-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/902,148

(22) Filed: Jul. 10, 2001

(30) Foreign Application Priority Data

Nov. 3, 2000 (KR) .......................................... 2000-65179

(51) Int. Cl.$^7$ .............................................. H04B 7/185
(52) U.S. Cl. .......................... 342/357.06; 342/357.12; 701/213
(58) Field of Search ....................... 342/357.02, 357.06, 342/357.12, 357.15; 701/213

(56) References Cited

U.S. PATENT DOCUMENTS 6,208,292 B1 * 3/2001 Sih et al. ................ 342/357.12
6,324,227 B1 * 11/2001 Kang et al. .................. 375/343

\* cited by examiner

*Primary Examiner*—Dao Phan
(74) *Attorney, Agent, or Firm*—Dilworth & Barrese, LLP

(57) ABSTRACT

A method of improving the reception performance of a network-aided GPS (Global Positioning System) receiver is disclosed. It is determined whether the present time is feasible for TLM/HOW coherent integration, based on present CDMA/GPS information. When the TLM/HOW coherent integration is immediately available, a GPS signal acquisition search is performed using the TLM/HOW coherent integration. Then, it is determined whether the signal acquisition search is successful. If the signal acquisition search has failed, then there is a request for navigation data bits to a base station, which increases a coherent integration period.

5 Claims, 4 Drawing Sheets

FIG. 2

| PREAMBLE | | | | | | | | | RESERVED | | | | | | | | | | | | | | | PARITY | | | | | |
|---|---|---|---|---|---|---|---|---|---|---|---|---|---|---|---|---|---|---|---|---|---|---|---|---|---|---|---|---|---|
| 1 | 0 | 0 | 0 | 1 | 0 | 1 | 1 | | | | | | | | | | | | | | | | | | | | | | |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 29 | 20 | 30 |

FIG. 3

| TOW COUNT MSB | | | | | | | | | | | | | | | | | ID | | | | | | | PARITY | | | | | |
|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 29 | 20 | 30 |

US 6,384,775 B1

METHOD OF IMPROVING THE RECEIVING PERFORMANCE FOR NETWORK-AIDED GPS RECEIVER

PRIORITY

This application claims priority to an application entitled "Method of Improving Receiving Performance for Network-Aided GPS Receiver" filed in the Korean Industrial Property Office on Nov. 3, 2000 and assigned Ser. No. 2000-65179, the contents of which are hereby incorporated by reference.

BACKGROUND OF THE INVENTION

1. Field of the Invention

The present invention relates generally to a global positioning system (GPS), and in particular, to a method of increasing the sensitivity and performance of a network-aided GPS receiver.

2. Description of the Related Art

A network-aided GPS receiver receives GPS satellite information from a base station through a data link, which gives the network-aided GPS receiver an advantage over a typical GPS receiver, by providing the network-aided GPS receiver position estimation and reception sensitivity.

Each GPS satellite transmits two microwave carrier signals, L1 and L2. The L1 frequency of 1,575.42 GHz contains modulation data of a coarse acquisition code (C/A code) and a navigation data message with a corresponding phase. The C/A code has a period of 1 ms.

The navigation data message has a 50 bps (bits per second) rate and provides the transmitting GPS satellite's orbit location, clock offset from GPS time, and, other system parameters.

FIG. 1 illustrates the structure of the navigation data message. The navigation data message is transmitted on a frame basis. Each frame has five sub-frames, where each sub-frame has 300 bits.

A GPS receiver coherently integrates a received GPS satellite signal with an autonomously generated C/A code over 1 ms and compares the integration sum of the GPS satellite signal and the autonomously generated C/A code with a threshold in order to acquire the GPS satellite signal.

A conventional GPS system is limited to only a 1-ms integration period for a C/A code in the coherent integration because it does not know when 50 bps navigation data bits are changed.

On the other hand, a CDMA (Code Division Multiple Access) system time provided by a CDMA or PCS (Personal Communication Services) network is synchronized precisely to a GPS time. Therefore, a network-aided GPS receiver on the CDMA or PCS network can acquire precise GPS time information and coherently integrates a C/A code, which is up to 20 ms and as long as a navigation data bit. As the integration period of the C/A code increases, the reception sensitivity of a GPS signal is improved. The 20-ms integration period increases the reception sensitivity by about 13 dB as compared to the 1-ms integration period.

To increase the C/A code integration period to 20 ms or longer, a GPS receiver must know navigation data bits that operating OPS satellites transmit. These navigation data bits may be derived from previously received navigation data bits but with the following problems:

(1) Ephemeris data, which is 60% of the navigation data bits, is valid for about one hour. This implies that the navigation data bits cannot be obtained every hour. It is impossible to precisely estimate when satellite orbital information is changed at the present;

(2) Almanac data, which is 40% of the navigation data bits is updated every five or six days. Since the entire almanac data is transmitted for 12.5 seconds, corresponding navigation data bits cannot be derived for the length of time; and (3) If the navigation data bits are transmitted with a time delay or a serving base station does not have the function of providing navigation data bits, it is impossible to derive corresponding navigation data bits.

SUMMARY OF THE INVENTION

It is, therefore, an object of the present invention to provide a method of improving GPS signal acquisition search sensitivity by maintaining an integration time for a C/A code and navigation data bits for a predetermined time or longer.

The above object is achieved by utilizing a method to improve the reception performance of a network-aided GPS receiver. It is determined whether the present time is feasible for TLM/HOW (Telemetry Word/Hand-Over Word) coherent integration based on the present CDMA/GPS information. When the TLM/HOW coherent integration is available immediately, a GPS signal acquisition search is performed using the TLM/HOW coherent integration. Then, it is determined whether the signal acquisition search is successful. If the GPS signal acquisition search has failed, requesting navigation data bits to a base station increases a coherent integration period.

BRIEF DESCRIPTION OF THE DRAWINGS

The above and other objects, features and advantages of the present invention will become more apparent from the following detailed description when taken in conjunction with the accompanying drawings in which:

FIG. 2 illustrates the structure of a GPS telemetry word included in the navigation data bits;

FIG. 3 illustrates the structure of a hand-over word included in the navigation data bits;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The present invention is intended to increase signal search sensitivity utilizing a telemetry word (TML) and a hand-over word (HOW) received from a GPS satellite in acquiring a GPS signal. Since the data bits of the TLM and the HOW can be estimated at any time, coherent integration can be executed for a predetermined time, for example, 20 ms or longer using the TLM and the HOW.

Figure 1:
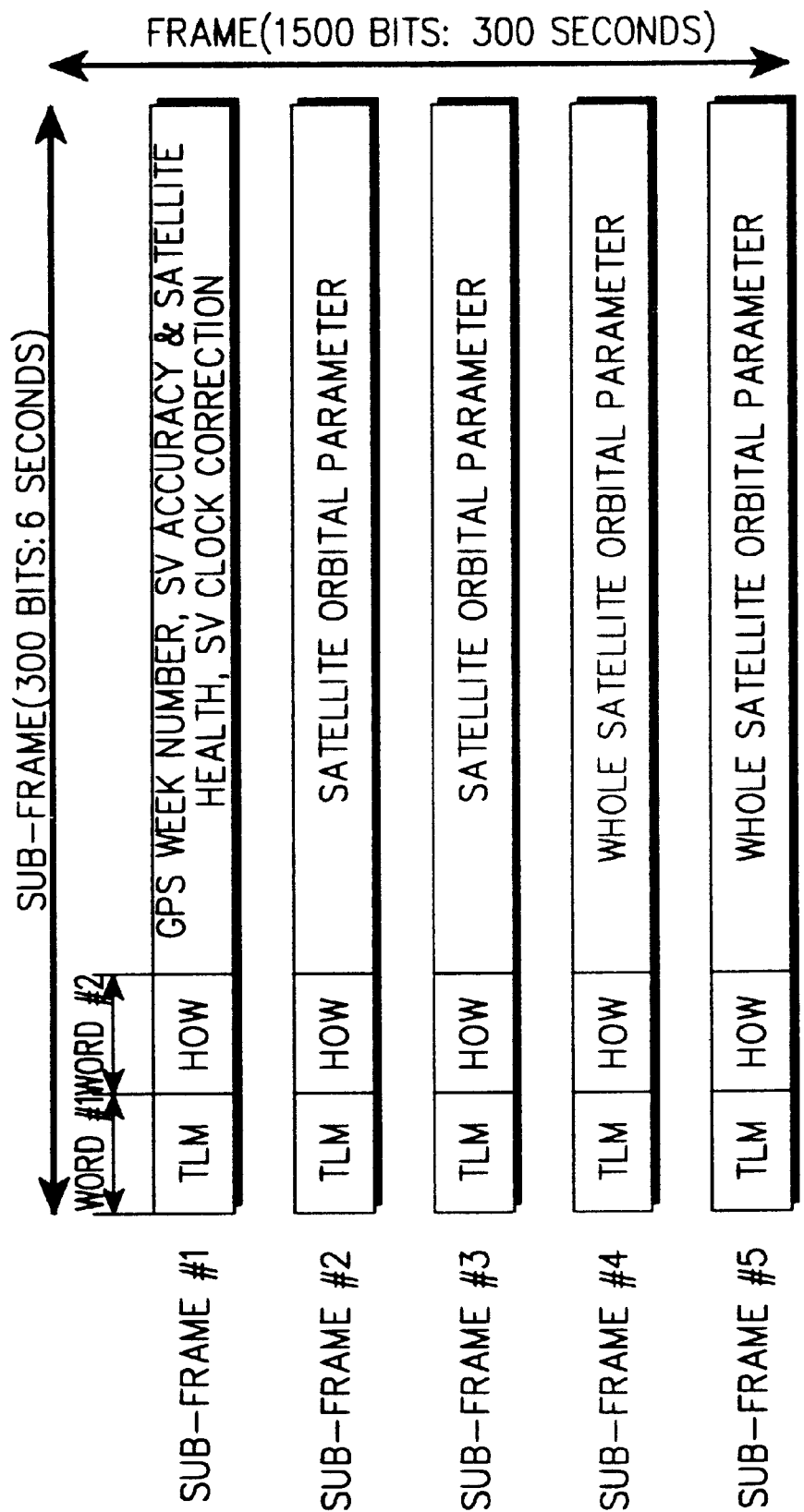
FIG. 1 illustrates the structure of navigation data bits.

A GPS navigation data message is transmitted on a frame basis. Referring to FIG. 1, one frame of a navigation data message has five sub-frames. One sub-frame includes 10 30-bit words. The first two words of each sub-frame are called a TLM and a HOW, respectively.

As shown in FIG. 1, sub-frame #1 contains a GPS week number, a space vehicle (SV), accuracy, satellite health, and SV clock correction information as well as a TLM and a HOW. Twenty-five navigation data frames, that is, 125 sub-frames are transmitted from #1 through #5 repeatedly. These navigation data frames form a navigation data message having a period of 12.5 seconds.

FIG. 2 illustrates the structure of the TLM.

Referring to FIG. 2, the most significant eight bits (eight MSBs) of the TLM are assigned as a preamble and has the value of 10001011. The TLM preamble is the same in every sub-frame and constant regardless of changes in a satellite orbit or whole satellite orbits.

Since the navigation data bits of the preamble can be estimated at any time, a coherent integration can be executed over 160 ms (=20 ms×8). This TLM coherent integration results in about 9 dB-increase in reception sensitivity, as compared to the conventional 20-ms coherent integration, by $$10 \log(\text{bit number}) = 10 \log(8) \cong 9.03 \text{ dB}$$

FIG. 3 illustrates the structure of a HOW included in a navigation data message.

Referring to FIG. 3, the MSBs of the HOW are 17 bits, which indicates the time of week (TOW) information that can be calculated by CDMA system time. The TOW of the HOW is related with the current time and is not influenced by changes in a satellite orbit or whole satellite orbits.

Since navigation data bits for the TOW in the HOW can be estimated, a coherent integration can be executed over 340 ms (=20 ms×17). This HOW coherent integration results in about 12 dB-increase in reception sensitivity, as compared to the conventional 20-ms coherent integration, by $$10 \log(\text{bit number}) = 10 \log(17) = 12.3 \text{ dB}$$

The above TLM or HOW coherent integration increases the reception sensitivity of a GPS signal by about 9 to 12 dB without the need of receiving additional navigation data bits, as compared to the conventional 20-ms integration method.

A TLM and a HOW occur every 6 seconds. This implies that 6 seconds must be awaited at the longest. Accordingly, a real network-aided GPS receiver may incorporate the TLM or HOW coherent integration method with the conventional 20-ms coherent integration method.

Figure 4:
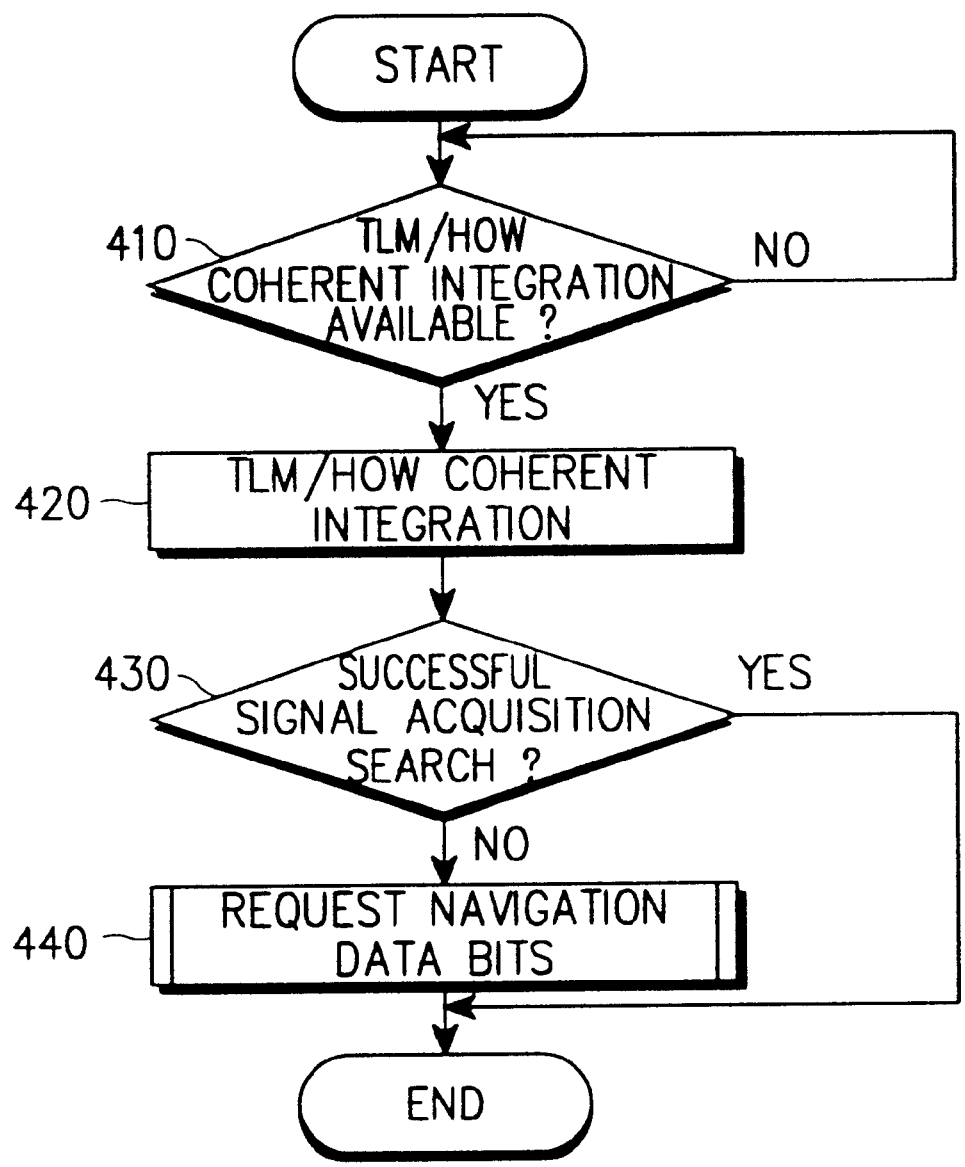
FIG. 4 is a flowchart illustrating a receiving operation in a network-aided GPS receiver, according to an embodiment of the present invention.

FIG. 4 is a flowchart illustrating a receiving operation in a network-aided GPS receiver, according to an embodiment of the present invention.

Referring to FIG. 4, a network-aided GPS receiver determines whether the current time is feasible for the TLM/HOW coherent integration, referring to the current CDMA/GPS information in step 410.

If it is impossible to use the TLM/HOW coherent integration method immediately, a TLM/HOW coherent integration available time is awaited and then the TLM/HOW coherent integration is executed at the available time in step 420.

In step 430, it is determined whether a GPS signal is successfully acquired. If the acquisition search is successful, the procedure is over.

In step 440, if the signal acquisition search fails, additional navigation data bits are requested to a base station to increase an integration period. After the integration period is increased, another GPS signal acquisition search is performed. If the GPS signal is successfully acquired, then the other GPS signal acquisition search is terminated successfully. However, if the GPS signal is not successfully acquired, through the other GPS signal acquisition search, then this is an indication that the current GPS signal level is too low to be acquired by the network-aided GPS receiver and, also in this case, the other GPS signal acquisition search is terminated.

The above-described method is implemented by the use of the TLM/HOW coherent integration alone in the case where a user can wait for 5 to 6 seconds, or due to software/hardware problems, etc., where it is not desirable to use the 20-ms coherent integration along with the TLM/HOW coherent integration.

Figure 5:
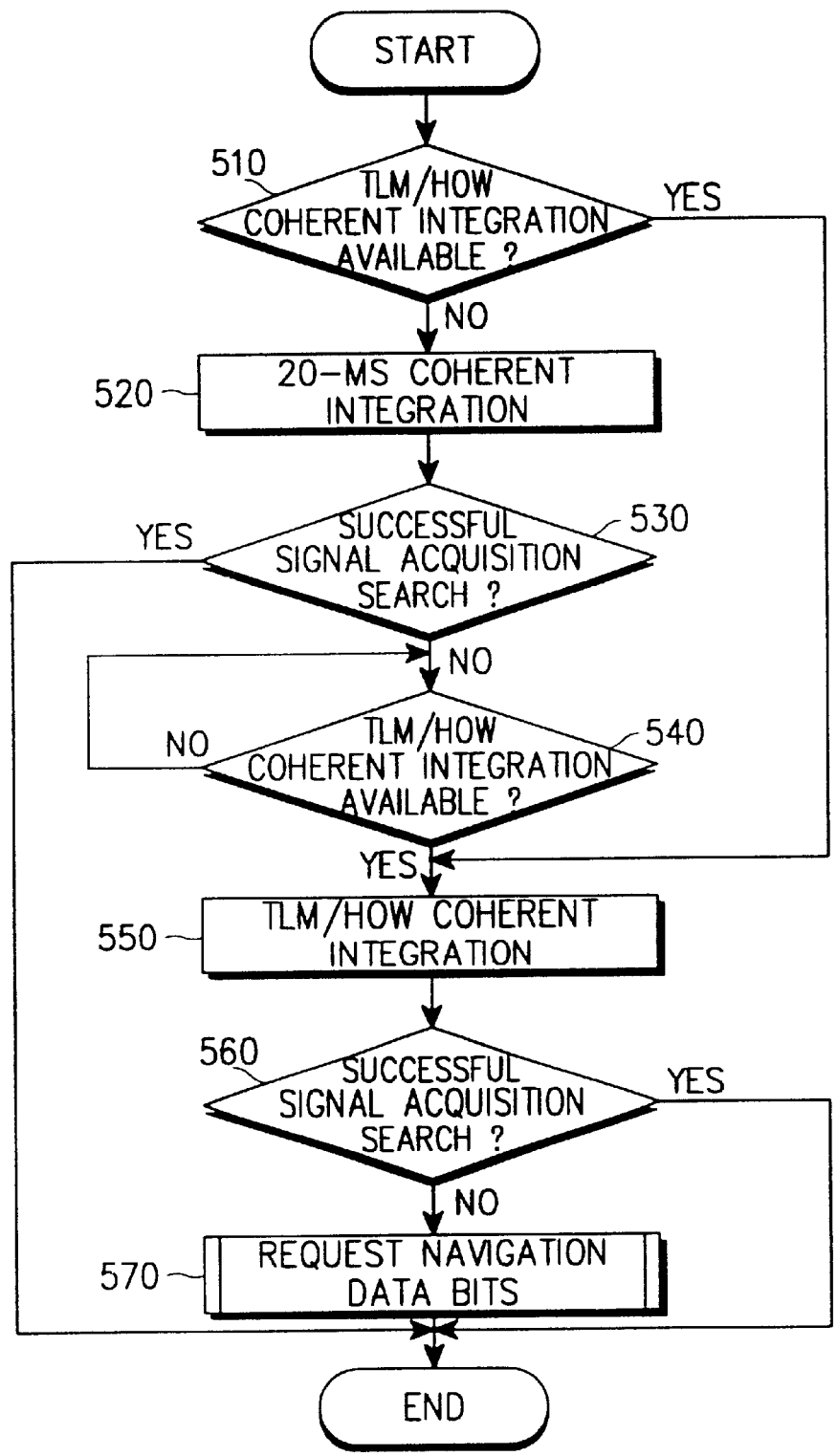
FIG. 5 is a flowchart illustrating a receiving operation in the network-aided GPS receiver, according to another embodiment of the present invention.

FIG. 5 is a flowchart illustrating a receiving operation in the network-aided GPS receiver, according to another embodiment of the present invention.

Referring to FIG. 5, a network-aided GPS receiver determines whether the current time is feasible for the TLM/HOW coherent integration, referring to the current CDMA/GPS information in step 510.

In step 520, if it is impossible to use the TLM/HOW coherent integration method immediately, then the conventional 20-ms coherent integration is executed. In some cases, it is preferable to perform a GPS signal acquisition search by the 20-ms coherent integration instead of waiting 5 to 6 seconds until the TLM/HOW coherent integration is available.

In step 530, it is determined whether a GPS signal is successfully acquired. If the acquisition search is successful, the procedure is over.

In step 540, if the GPS signal acquisition search fails, then it is determined whether the current time is feasible for the TLM/HOW coherent integration, referring to the current CDMA/GPS information. If it is impossible to use the TLM/HOW coherent integration method immediately, then there is a wait for a TLM/HOW coherent integration to become available. After the failed 20-ms coherent integration-based signal search occurs, an action time for the 20-ms coherent integration should be appropriately set, in step 520, to enter the TLM/HOW coherent integration-based search immediately.

In step 550, the TLM/HOW coherent integration is executed at the available time.

In step 560, it is determined whether a GPS signal is successfully acquired. If the acquisition search is successful, the procedure is over.

In step 570, if the signal acquisition search fails, additional navigation data bits are requested to the base station to increase an integration period. After the integration period is increased, another GPS signal acquisition search is performed. If the GPS signal is successfully acquired, then the other GPS signal acquisition search is terminated successfully. However, if the GPS signal is not successfully acquired, through the another GPS signal acquisition search, then this is an indication that the current GPS signal level is too low to be acquired by the network-aided GPS receiver and, also in this case, the other GPS signal acquisition search is terminated.

In conclusion, the above-described method incorporates the TLM/HOW coherent integration with the conventional 20-ms coherent integration.

In accordance with the present invention, use of the TLM/HOW coherent integration increases the reception sensitivity of a GPS signal by about 9 to 12 dB, as compared to the conventional 20-ms coherent integration. Both the TLM and HOW coherent integrations are very stable and reliable because they are immune against changes in satellite navigation information and obviate the need of requesting additional navigation data bits to a base station. With the TLM/HOW coherent integration and the conventional 20-ms coherent integration in combination, a GPS signal acquisition search can be immediately executed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of improving reception performance for a network-aided GPS (Global Positioning System) receiver, comprising the steps of:

determining whether a present time is feasible for a TLM/HOW (Telemetry Word/Hand-Over Word) coherent integration based on a present CDMA/GPS (Code Division Multiple Access) information;

performing a GPS signal acquisition search using the TLM/HOW coherent integration when the TLM/HOW coherent integration is immediately available;

determining whether the GPS signal acquisition search is successful; and terminating the GPS signal acquisition search, if the GPS signal acquisition search is successful.

2. The method of claim 1, further comprising the step of waiting until the TLM/HOW coherent integration is available if the TLM/HOW coherent integration is not immediately available.

3. The method of claim 1, further comprising the step of:

requesting navigation data bits to a base station, if the GPS signal acquisition search has failed; and increasing a coherent integration period by using the navigation data bits and then performing another GPS signal acquisition search.

4. A method of improving reception performance for a network-aided GPS (Global Positioning System) receiver, comprising the steps of:

determining whether a present time is feasible for a TLM/HOW (Telemetry Word/Hand-Over Word) coherent integration based on a present CDMA/GPS (Code Division Multiple Access) information;

performing a GPS signal acquisition search based on a 20-ms coherent integration when the TLM/HOW coherent integration is not immediately available; determining whether the 20-ms coherent integration signal acquisition search is successful;

performing a GPS signal acquisition search using the TLM/HOW coherent integration, if the 20-ms coherent integration signal acquisition search fails or the TLM/HOW coherent integration is immediately available;

determining whether the TLM/HOW coherent integration signal acquisition search is successful; and increasing a coherent integration period by requesting navigation data bits to a base station, if the TLM/HOW coherent integration signal acquisition search has failed.

5. The method of claim 4, further comprising the step of waiting until the TLM/HOW coherent integration is available, if the TLM/HOW coherent integration is not immediately available after the 20-ms coherent integration signal acquisition has failed.

* * * * *